United States Patent [19]
Tashiro et al.

[11] Patent Number: 6,113,960
[45] Date of Patent: Sep. 5, 2000

[54] METHOD FOR COATING FOOD PIECES WITH POWDER MATERIAL

[75] Inventors: Yasunori Tashiro; Kazuyoshi Kurasawa; Masaki Hosoya, all of Tochigi-ken, Japan

[73] Assignee: Rheon Automatic Machinery Co., Ltd.

[21] Appl. No.: 09/261,085

[22] Filed: Mar. 2, 1999

Related U.S. Application Data

[62] Division of application No. 08/932,325, Sep. 17, 1997.

[30] Foreign Application Priority Data

Sep. 17, 1996 [JP] Japan ................................. 8-266657

[51] Int. Cl.⁷ ....................................................... A23B 4/10
[52] U.S. Cl. ............................ 426/289; 426/295; 118/19; 118/30; 118/418; 99/494; 427/242
[58] Field of Search ..................................... 426/295, 289; 118/19, 30, 303, 418; 99/494; 366/153.5, 186; 427/242, 180

[56] References Cited

U.S. PATENT DOCUMENTS 4,808,424 2/1989 Wadell ................................ 426/295 X
5,514,399 5/1996 Cordera et al. ......................... 426/295
5,698,252 12/1997 Kelly et al. ........................ 426/295 X

*Primary Examiner*—Milton Cano
*Attorney, Agent, or Firm*—Brinks Hofer Gilson & Lione

[57] ABSTRACT

A method for coating food pieces with powder material. The apparatus includes a drum having a pair of opposing side openings, and engaging members mounted on a cylindrical inner surface thereof. Powder material is sifted by the engaging members as the drum is rotated. An inlet member extends through one of the openings and deposits food pieces into the drum such that one food piece is deposited onto the powder material located between each adjacent pair of engaging members at a bottom portion of the drum. Rotation of the drum causes the food piece to roll on the powder material, thereby completely coating the food piece, and causes the engaging members to lift the coated food pieces to an upper portion of the drum until the coated food pieces roll or slide off of the engaging members. An outlet member is positioned to receive the coated food pieces as they roll or slide from the engaging members.

4 Claims, 3 Drawing Sheets

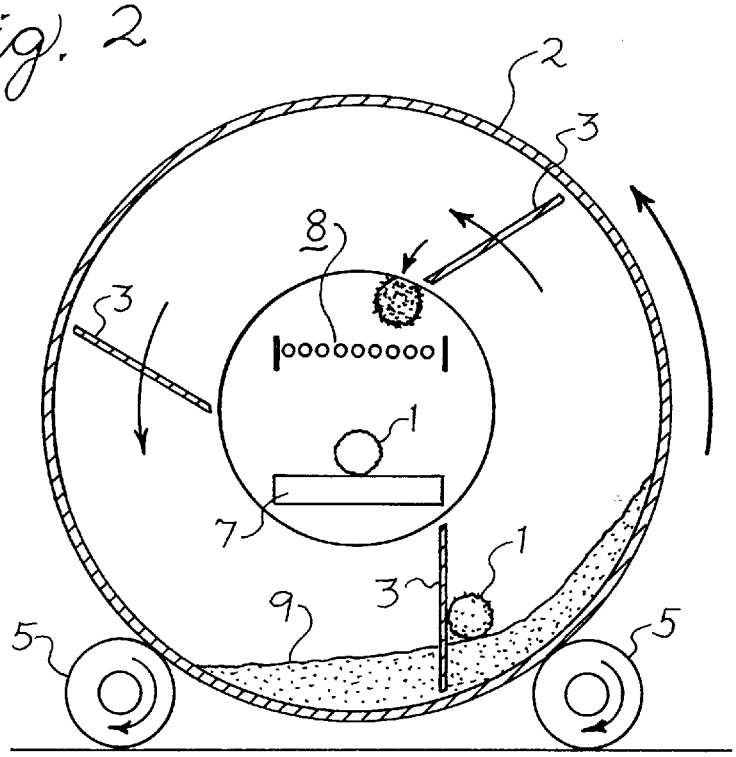

METHOD FOR COATING FOOD PIECES WITH POWDER MATERIAL

This application is a division of application Ser. No. 08/932,325, filed Sep. 17, 1997.

BACKGROUND OF THE INVENTION

1. Field of the Invention

This invention relates to a method and apparatus for coating powder material, such as soybean flour, sesame or green laver, onto food pieces (for example, dumplings, such as rice dumplings mixed with mugwort or covered with bean jam, or rice balls) such that the food pieces are coated by the powder.

2. Description of the Related Art

One type of prior-art coating machine includes a mechanism which is disposed over a conveyor for depositing powder material onto the upper or side surfaces of food pieces conveyed on the conveyor. A problem with these machines is that the bottom surfaces of the food pieces cannot be coated with the powder material.

An improved coating method which addresses the above-mentioned problem is disclosed, for example, in Japanese Patent Publication No. 62-46149. The method comprises the steps of continuously conveying and feeding both food pieces formed in a given shape and grain flour into a drum, and rotating the drum to continuously coat the food pieces with the grain flour within the drum, wherein both the food pieces and the grain flour are rolled together by means of baffle rods in the drum so that the food pieces are coated with the powder.

In the above-mentioned prior-art coating machine, grain flour and food pieces are rolled together to coat the food pieces with the powder, and grain flour which does not adhere to the food pieces can be recovered and effectively reused. However, because adequate space within the drum is needed to coat the food pieces with the grain flour, the drum must be large, thereby occupying a considerable space.

Also, the drum is tilted so its outlet is positioned lower than its inlet in order to discharge the coated food pieces. This difference in height between the inlet and outlet causes some problems. When supplemental manual operations are performed, the working environment around the lower outlet is not good, especially over a long time.

Further, when the production line including the coating drum is used to produce food products which do not need a powder coating, the drum must be removed from the production line, which requires significant effort and time.

SUMMARY OF THE INVENTION

The purpose of this invention is to provide an apparatus and method for coating food pieces with powder material which avoids the limitations of the prior art apparatus/methods, discussed above.

In accordance with the present invention, an apparatus for coating powder material onto food pieces comprises a drum for holding powder material, the drum having engaging members disposed on the inner surface of the drum for engaging food pieces which are fed into the drum, an opening provided on a side of the drum, and inlet and outlet members provided at the opening.

In one embodiment, the engaging members that are shaped into a comb or wire net are equidistantly disposed on the inner cylindrical surface of the drum.

In another embodiment, the outlet member extends through the opening so as to be placed above the inlet member in the drum.

In another embodiment, the outlet member is a conveyor belt formed by a plurality of string-shaped belts mounted on rollers.

In a further embodiment, the respective ends of the inlet and outlet members can be aligned to form a single horizontal conveying surface passing through the drum.

When food pieces or similar products are fed into the thus-structured apparatus, they are coated with powder material as they roll within the drum holding the powder material. The coated food pieces are then scooped up by the engaging members and deposited on the outlet member which transfers the coated food pieces out of the drum. Because the outlet member is inserted through the outlet opening so as to be placed at an upper part in the drum, and because the outlet member comprises a conveyor belt including a plurality of string-shaped belts wound on rollers, the excess powder on the coated products falls between and through the string-shaped belts into the bottom of the drum to circulate therein.

BRIEF DESCRIPTION OF THE DRAWINGS

FIG. 2 is a partial section view taken along line A—A of FIG. 1, showing the operation of the first embodiment.

FIG. 3 is a partial section also showing the operation of the first embodiment.

DETAILED DESCRIPTION OF THE INVENTION

Figure 1:
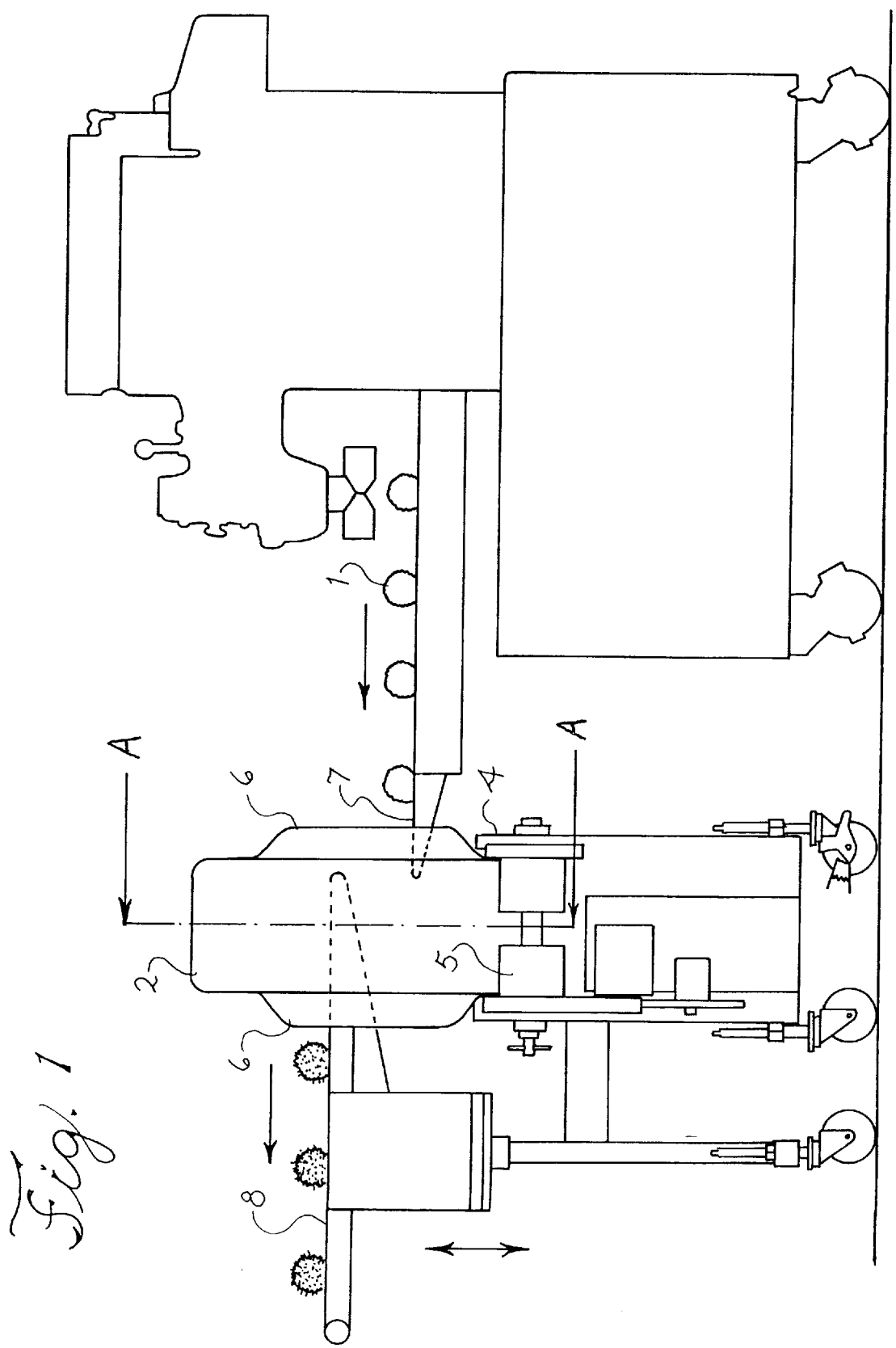
FIG. 1 is a side view showing a first embodiment of the present invention.

A first embodiment of the coating apparatus of this invention will now be described by reference to FIGS. 1–3.

The coating apparatus of this embodiment includes a drum 2 for sprinkling a food piece 1, and a driving base 4 for supporting the drum 2 and for rotating the drum 2 around its central axis.

As shown in FIG. 3, comb-shaped engaging members 3 are mounted on the inner surface of the drum 2. The comb-shaped engaging members 3 are disposed such that the inner surface is equidistantly divided into portions separated by the engaging members 3. The engaging members 3 extend from the inner surface generally toward the center of the drum 2.

Two driving rollers 5 are mounted horizontally on the upper part of the driving base 4. The drum 2 is supported by the driving rollers 5.

Two openings 6 are provided on opposite sides of the drum 2. An end portion of a feed-in conveyor 7, which serves as an inlet member for food pieces, extends through one of the openings 6 into the drum 2. An end portion of a discharge conveyor 8, which serves as an outlet member for coated food pieces, extends through the other opening 6 into the drum 2. The feed-in conveyor 7 is disposed at the lower part of the opening 6, while the discharge conveyor 8 is disposed at an upper part of the opening 6.

The operation and effects of the first embodiment will now be described. Powder material 9 is held in the drum 2, and is lifted by the inner surface of the drum 2 in the direction of the rotation, and then falls due to gravity into a bottom portion of the drum 2. When a food piece 1 is dropped into the drum 2 by the feed-in conveyor 7, the piece 1 falls onto and into the powder material 9 in the bottom portion of the drum 2, and rolls along with the powder material 9 by means of both the rotation of the drum 2 and the flow of the powder material 9, so that all of the surfaces of the food piece 1 are coated with the powder material 9.

As the drum rotates further, the coated product 1 engages the engaging member 3, and is scooped up thereby. At this time, the powder material 9 falls through the spacing that is provided between the projections forming the comb-like engaging members 3, and only the food piece 1 is conveyed by the rotation of the drum 2 to its upper part. As the degree of the slant of the engaging member 3 gradually increases, the conveyed piece 1 slides or rolls along the engaging member 3, and then falls from the engaging member 3 onto the discharge conveyor 8, and conveyed downstream thereby as a finished coated food product.

In the first embodiment, two driving rollers 5 are used to support the drum 2. In an alternative embodiment, just one driving roller is sufficient to support the drum, and the other roller may be used as a driven roller.

Further, although the driving rollers abut the periphery of the drum 2 to support and drive the drum 2, separate supporting and driving parts may be provided.

Moreover, although the outer periphery of the drum 2 is used as a drive-transmission surface, the apparatus is not so limited, and any portion of the drum 2 may be used for this purpose.

Further, the engaging members 3 extend from the inner surface of the drum toward its center so that the food pieces 1 are transferred (dropped) to the discharge conveyor 8 at an appropriate moment when the engaging members 3 are positioned over the discharge conveyor 8 at an upper part of the drum. However, if the end portion of the discharge conveyor 8 is repositioned within the drum 2, the angle of the engaging members 3 can be adjusted accordingly to transfer the food pieces so that the food pieces fall onto the discharge conveyor 8.

A belt consisting of one sheet may be used for the discharge conveyor 8. However, if a significant amount of powder material is lifted with the food piece 1 and falls onto the discharge conveyor 8, the falling powder material can be easily sifted by forming the discharge conveyor 8 using string-shaped round belts wound around rollers.

In the first embodiment two openings 6 are provided, one on each side of the drum 2. However, when the space for installing the apparatus is limited or when the apparatus is used solely as a powder-material sprinkler (when it is not used as a transfer conveyor), the feed-in and discharge conveyors can be disposed to extend through a single opening into the drum 2 to obtain the same operational effects.

Further, the position of the discharge conveyor 8 can be adjusted by a lifting mechanism (not shown) so that the end portion of the discharge conveyor 8 aligns with the end portion of the feed-in conveyor 7 to form a continuous conveyor through the drum 2.

The apparatus of the first embodiment can be effectively operated when powder material 9 with a weak adhesion, such as sesame or green laver, is used. However, in some cases where powder material contains moisture or oil, the powder material may form lumps which do not adhere to the food pieces 1. Specifically, powder material 9 which contains moisture or oil tends to lump when the engaging members 3 are mounted vertically (radially toward the central axis) on the inner surface of the drum 2 because the powder material 9 tends to adhere to the engaging members 3, and pressure is applied to the powder material 9 by both the pressing force from the engaging members 3 and the resisting force due to the reaction caused by the flow thereof. If the lumps of material 9 grow too large, they are prevented from passing through the spaces of the comb-shaped engaging members 3, so that the thus-produced lumps of material are lifted by the engaging members 3 and then poured to the bottom of the drum 2 by the rotation of the drum 2. This causes problems in that, because the lumpy powder material 9 cannot pass through the engaging members 3, at some point no powder material 9 is present on the portion of the inner surface located at the bottom of the drum 2; if a food piece 1 is subsequently fed into the drum 2 at this point, it will adhere to the inner surface of the drum 2. One solution would be to widen the spaces between the comb-shaped engaging members 3 to allow passage of lumps of the powder material 9. However, the spacing of the comb-shaped engaging members 3 cannot be enlarged beyond the size of the food pieces 1

A second embodiment will now be described with reference to FIG. 4. The second embodiment addresses the above-mentioned lumping problem.

The second embodiment mainly differs from the first embodiment in that engaging members of different shapes are mounted on the inner surface of the drum 2. Mainly, the features of the engaging members of the second embodiment will be described. In the following description, like reference numbers designate common or related elements in the first embodiment, and the description of these elements is eliminated for brevity.

Figure 4:
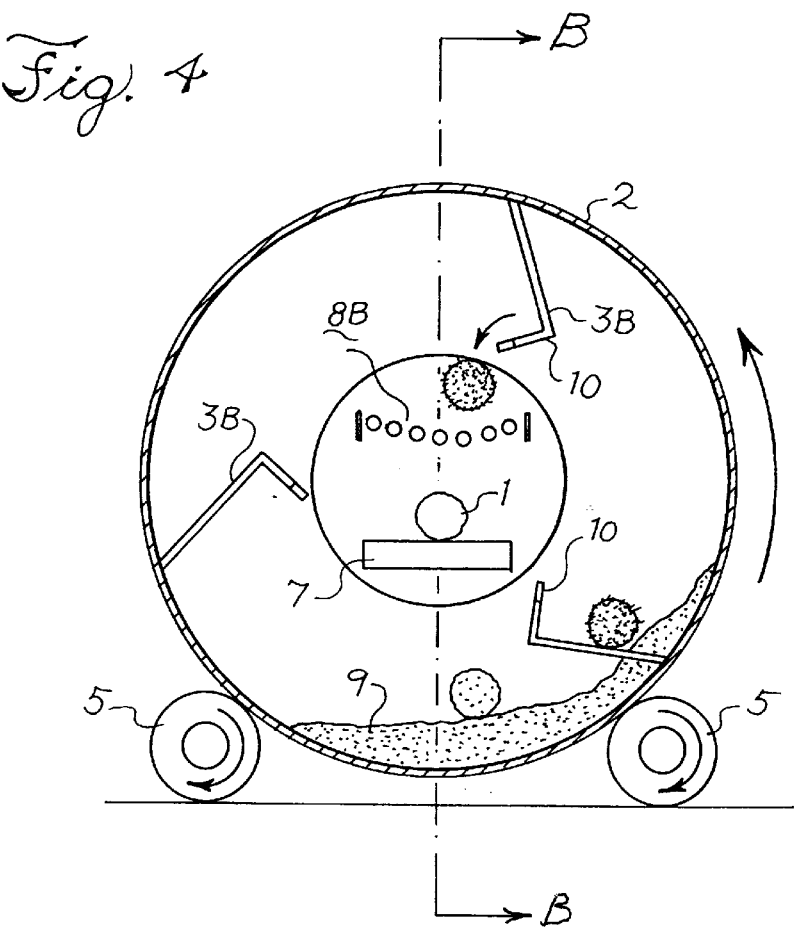
FIG. 4 is a partial section showing the operation of a second embodiment.
Figure 5:
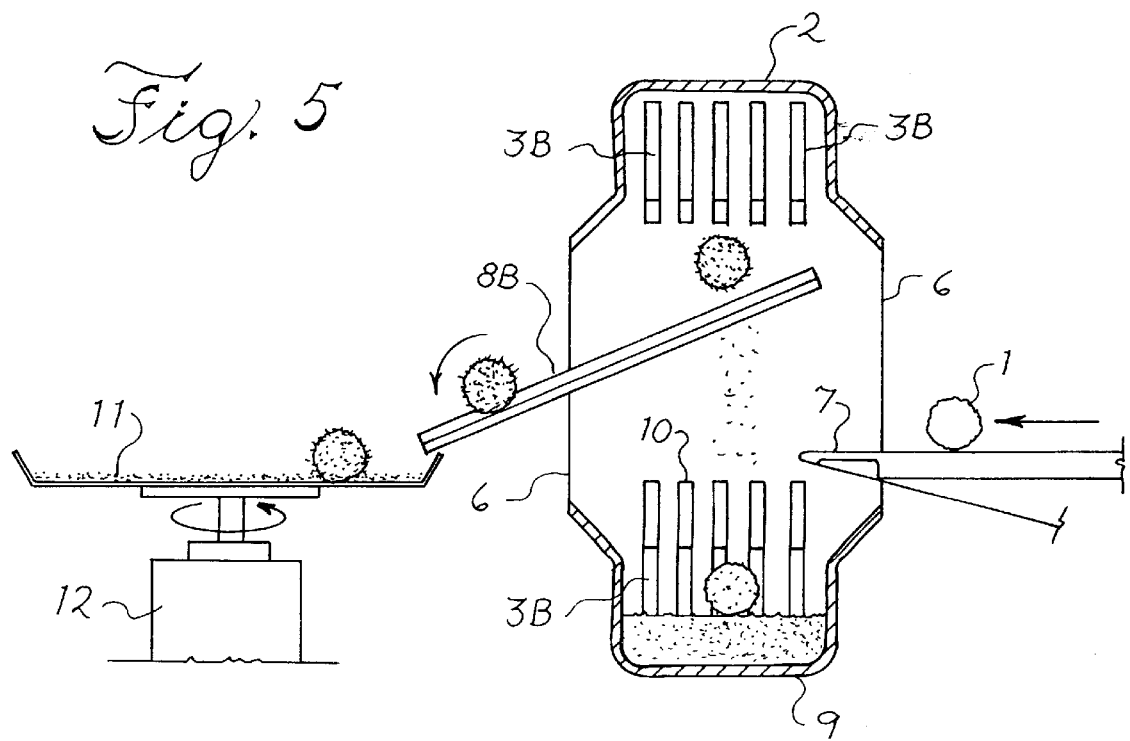
FIG. 5 is a partial section along line B—B of FIG. 4, also showing the operation of the second embodiment.

Referring to FIG. 4, comb-shaped engaging members 3B are mounted on the inner surface of the drum 2 at positions that equidistantly divide the inner circumference of the drum 2. Each engaging member 3B extends from the inner surface toward the center of the drum 2, and is tilted away from the direction of rotation by about 45 degrees. Each engaging member 3 has a folded part or a projection 10 extending from an end thereof toward the direction of rotation.

An outlet member or discharge conveyor 8B is disposed such that its end portion, which is inserted through the opening of the drum 2, is positioned at an upper portion of the drum 2, and a body thereof extends from and slants downward from the drum 2. The outlet member 82 comprises a plurality of thin shafts arranged in parallel to form a chute. As indicated in FIG. 4, the chute has a U-shaped cross-section to securely hold coated food pieces 1. A turntable 11, for holding coated pieces, is disposed at the end of the outlet member 8B. The turntable 11 is a circular plate with a raised edge, and is driven by a motor 12 located thereunder.

The operation and effects of the second embodiment will now be described. In this embodiment, comb-shaped engaging members 3B are mounted on the inner surface of the drum 2 at positions that equidistantly divide the inner circumference of the drum 2, so that each engaging member is slanted by about 45 degrees from the center of the drum away from the direction of rotation. Thus, the powder material 9 abutting the engaging member 3B can easily rebound or spread toward the center of the drum 2, so that the so-called bridge phenomenon can be avoided, and so that the comb-shaped engaging member 3B can avoid being clogged with the powder material 9.

The above-mentioned constitution enables the engaging members 3B to provide a large total area for the spaces through which the powder material 9 passes. Thus, regardless of the lumping properties of the powder material 9 (such as soybean powder), it can easily pass through the spaces of the comb-shaped engaging members 3B, so that it stays at the bottom of the drum 2. Therefore, the apparatus can perform continuous coating operations without any food piece 1 adhering to the inner surface of the drum 2.

Further, because each engaging member 3B has a folded part or projection 10 extending vertically from its end toward the direction of rotation, no food piece 1 can fall from the engaging members during the rotation, so that the food piece can be securely transferred onto the discharge conveyor. The preferable angle of inclination of the engaging members 3B can be selected at any time, considering the properties of the powder material 9 and the position of the food piece 1 on the discharge conveyor.

The food piece 1 released from the engaging members 3B at the upper part of the drum 2 is held on a discharge conveyor 8B. The discharge conveyor 8B, which is curved in cross section, causes the food piece to securely roll or slide onto the turntable 11.

Although the engaging members in the first and second embodiments are comb-shaped, they are not limited to that shape. Engaging members of any shape, for example, net-shaped or plate-shaped members, may be used, so long as they can engage the food pieces 1.

As is clear from the above explanation, this invention has the following effects:

Because engaging members for engaging food pieces in a drum are mounted on the inner surface of the drum for holding powder material, and because inlet and outlet members for the food pieces extend through an opening provided at least on one side of the drum so that the inlet and outlet members are respectively arranged in lower and upper portions of the opening so as to effectively use the entire space inside the drum, the apparatus can be made smaller compared with prior-art sprinkling devices.

In the drum of the present invention, because the powder material is circulated, and because comb-shaped or wire net-shaped engaging members are mounted on the inner surface of the drum at positions that divide the inner circumference of the drum, the powder material is always kept at the bottom of the drum by being sifted through the spaces provided by the engaging members. Only the food pieces in the drum are lifted by the engaging members, so the amount of powder material used is effectively reduced.

Because the outlet member extends through the opening into the drum, and because the outlet member may be a conveyor belt made from a plurality of string-shaped belts wound about rollers, the powder material can be circulated without the need for any extra material to be discharged.

Because the respective ends of the inlet and outlet members can be closely aligned in the same horizontal plane to form a continuous conveyor, it is unnecessary to remove the drum even when no coating operations are needed. This eliminates extra work.

Because in the apparatus of the present invention food pieces can be discharged from the drum by synchronizing the timing of depositing the food pieces into the drum with its pitch of rotation, alignment work or packing work at the downstream production process can be easily carried out.

Because the drum is detachably mounted on a driving base, various kinds of products can be easily produced by merely exchanging one drum for another, with a plurality of different kinds of powder material being stored in respective drums.

Further, because the powder material can be circulated within the drum without the need to discharge it outside the drum, recovery and reuse of the powder is unnecessary, and the amount of powder material used is reduced. Further, because hygienic work can be automatically carried out, contamination of the food pieces by germs can be prevented.

We claim:

1. A method for coating food pieces with powder material comprising:

supplying and depositing food pieces into a drum with the powder material contained therein, the drum having a plurality of longitudinally disposed engaging members mounted on inner surface of the drum for scooping up coated food pieces;

tumbling the food pieces with the powder material such that excess powder material freely falls through the engaging members while lifting the coated food pieces; and, removing the coated food pieces from the drum.

2. A method of claim 1, wherein the food pieces are removed from the top portion of the drum.

3. A method of claim 2, wherein the timing of the supply of the food pieces is synchronized with the rotation of the rotating drum.

4. A method of claim 3, wherein both the height within the drum where food pieces are supplied and the coated food pieces that are removed can be aligned to form a continuous conveying path.

* * * * *